United States Patent [19]
Wolf

[11] 4,072,737
[45] Feb. 7, 1978

[54] METHOD FOR PRODUCTION OF HOLLOW ARTICLES FROM INJECTION MOLDED PREFORMS USING INSULATED RUNNER SYSTEM

[75] Inventor: William D. Wolf, Simsbury, Conn.
[73] Assignee: Monsanto Company, St. Louis, Mo.
[21] Appl. No.: 662,141
[22] Filed: Feb. 27, 1976
[51] Int. Cl.² .......................................... B29C 17/07
[52] U.S. Cl. .................................... 264/97; 264/328; 264/331
[58] Field of Search ................................ 264/328–329, 264/331, 322, 320, 209, 97, 94

[56] References Cited
U.S. PATENT DOCUMENTS

| | | | |
|---|---|---|---|
| 3,021,568 | 2/1962 | Scott, Jr. | 264/328 |
| 3,093,865 | 6/1963 | Peters et al. | 264/328 |
| 3,159,878 | 12/1964 | Scott, Jr. et al. | 264/328 |
| 3,520,026 | 7/1970 | Stidham et al. | 264/329 |
| 3,677,682 | 7/1972 | Putkowski | 425/192 |
| 3,900,120 | 8/1975 | Sincock | 215/1 C |

OTHER PUBLICATIONS

Plastics Machinery and Equipment "Hot-Runner Molding: A Review" J. H. DuBois, vol. 4, No. 12, Dec. 1975, pp. 12, 14 & 15.

Primary Examiner—Jeffery R. Thurlow
Attorney, Agent, or Firm—Michael J. Murphy

[57] ABSTRACT

Hollow articles such as bottles and containers are formed from tubular, elongated, reheated injection molded preforms made of thermoplastic material by a method which comprises injection molding said preforms using a mold distribution system having an insulated runner connecting an inlet sprue with one or more externally heated orifice gate channels.

10 Claims, 3 Drawing Figures

METHOD FOR PRODUCTION OF HOLLOW ARTICLES FROM INJECTION MOLDED PREFORMS USING INSULATED RUNNER SYSTEM

BACKGROUND OF THE INVENTION

This invention relates to an improved method for forming hollow articles from reheated injection molded thermoplastic preforms by injection molding said preforms using a selected mold distribution system.

It is known to thermoform molded, elongated, tubular thermoplastic preforms into hollow articles such as bottles and containers. One particularly desirable method for producing the preforms that are used is by injection molding since such method allows for the high production of parts having very uniform dimensions and weight distribution. A variety of mold distribution systems have been disclosed in the injection molding technology as disclosed for example in "Injection Molding Theory and Practice" by Irvin I. Rubin, 1972, chapter 2. One particularly attractive system involves the use of an insulated runner, however, the use of a cartridge heater or heated torpedo extending into the gate channel as commonly used in such a system, creates significant lean and distortion problems when reheating molded preforms. This lean causes thermoformed articles prepared from such preforms to have an undesirable variation in wall thickness and often the minimum acceptable limits will not be satisfied.

SUMMARY OF THE INVENTION

Now in accordance with this invention, there has been developed an improved method for forming hollow thermoplastic articles from injection molded preforms.

Accordingly, a principal object of this invention is to provide an improved method for thermoforming tubular, elongated thermoplastic, reheated injection molded preforms into hollow articles by using a selected mold distribution system in the formation of said injection molded preforms.

Another object is to provide hollow, thermoplastic articles having reduced wall thickness variation by thermoforming reheated injection molded preforms formed using a selected mold distribution system.

A further object is to prepare hollow articles such as bottles and containers made of high nitrile polymer from reheated injection molded preforms formed using a selected mold distribution system.

Other objects of this invention will in part be obvious and will in part appear hereinafter.

These and other objects are accomplished by providing a method for the production of hollow articles by thermoforming tubular, elongated reheated injection molded preforms, said preforms being injection molded using a mold distribution system having an insulated runner connecting an inlet sprue with one or more externally heated, orifice gate channels.

BRIEF DESCRIPTION OF THE DRAWINGS

In describing the overall invention, reference will be made to the accompanying drawings wherein.

DETAILED DESCRIPTION OF THE INVENTION

Figure 1:
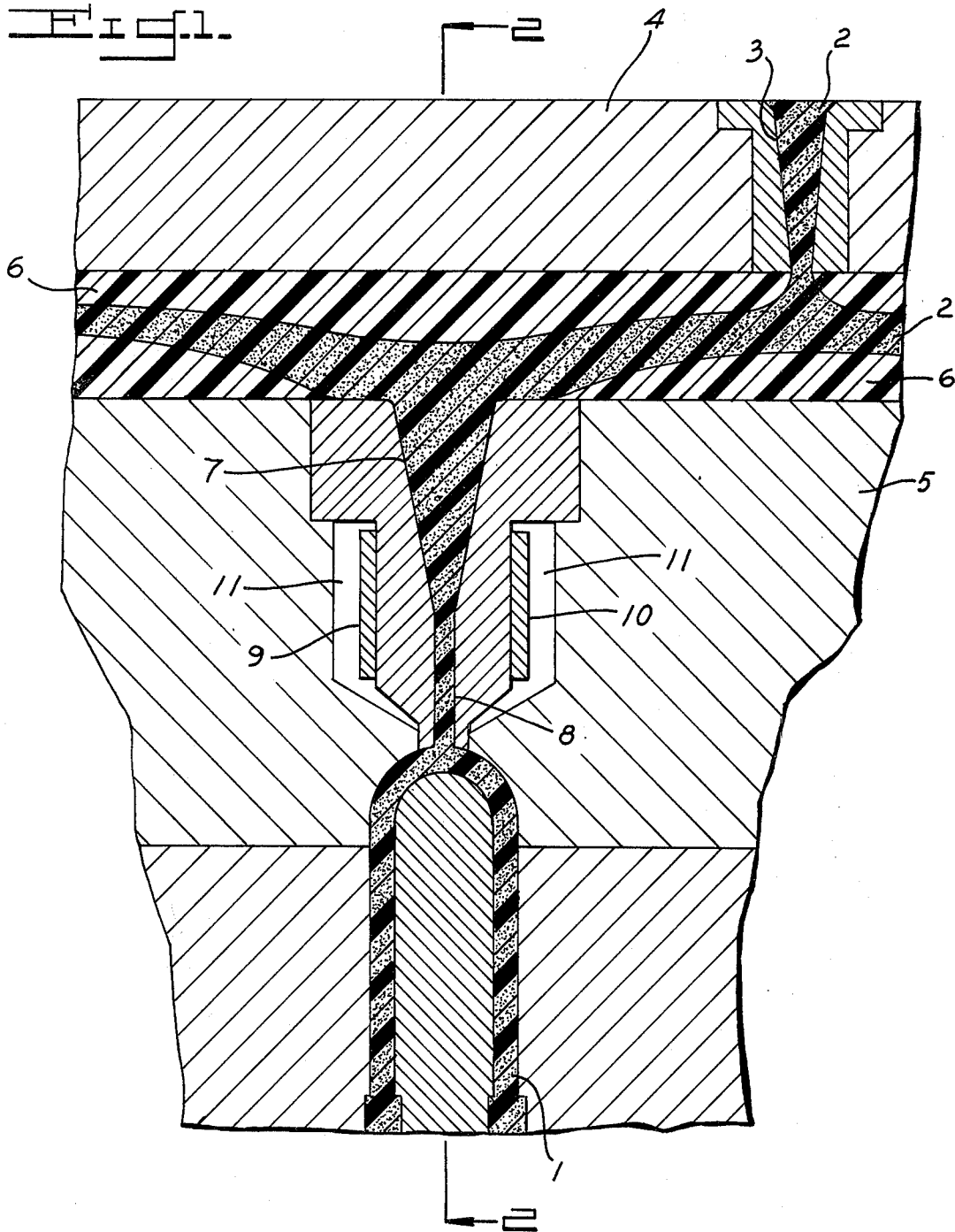
FIG. 1 is a schematic cross sectional view of a mold distribution system useful in the method of this invention.

In carrying out the method of this invention, a tubular elongated injection molded preform made of a thermoplastic material and having a general configuration of the cavity 1 as shown in the drawings, is formed using the mold distribution system illustrated in the drawings.

Molten thermoplastic material 2 is charged from an injection molding machine (not shown) to an an inlet sprue 3. The thermoplastic material flows from the sprue into the runner system or channel located between plates 4 and 5. The portion of thermoplastic material initially flowing into the runner channel hardens as it contacts the cooler runner surfaces formed by plates 4 and 5. This is shown in the drawings by the outer layer of thermoplastic material designated as 6. The inner material 2 remains at a sufficiently high temperature and continues to flow by tunneling through the center of the runner with the outer hardened core of material acting as an insulator and the overall system is called an insulated runner system.

Figure 2:
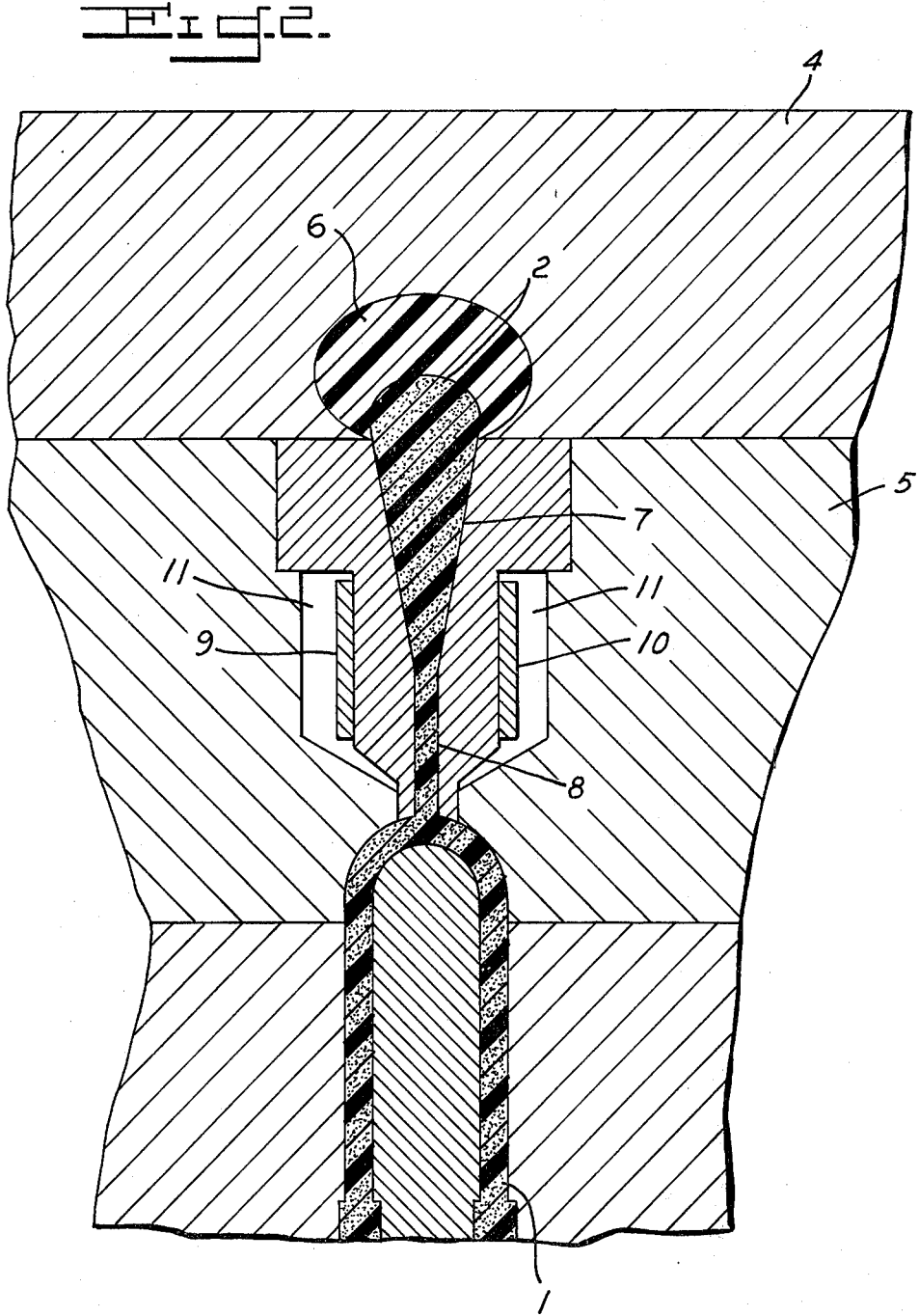
FIG. 2 is a cross section along line 2—2 of FIG. 1.

Orifice gate channels connecting the insulated runner and the mold cavity 1 are provided to allow the plastic material 2 to flow into said cavity. The orifice gate channels as shown in FIGS. 1 and 2, comprise a coned out inlet or approach section 7 and an elongated tubular or cylindrical orifice section 8 in the form of a cylindrical bore without any torpedo-like member therein in the thermoplastic material flow direction. While the gate channel may comprise a single, uniform, straight-through or orifice section 8, i.e. without the coned inlet section, it is desirable to have such coned inlet or approach section to allow for easier mechanical and physical adaptation of a replaceable mold system and also to provide more desirable operating conditions. Heaters located externally to the orifice gate channels or outside the flow of material in said channels are provided in the blocks surrounding said gate channels as illustrated by heater bands 9 and 10. An air space or gap 11 is also shown surrounding the heater bands to provide for better overall temperature control.

While band type heaters are illustrated in the drawings, a variety of other type heaters such as tubular and cartridge heaters, as disclosed in "Injection Molding Theory and Practice" by I. I. Rubin, pp. 507–571, may be used in this invention. The temperature in the heater bands will generally be maintained above the Tg (glass transition temperature) for the material being molded to maintain fluidity and to prevent freeze off in the gate channel. The plates 4 and 5 containing the runner system may also be maintained at a particular desired temperature by heaters, not shown, and this will depend on the particular material being used. Generally when controlling the plate temperature, a temperature which approaches Tg may be used and in such instance, the runner system in actuality may be called a modified hot runner or modified insulated runner system.

The particular size and dimensions of the orifice gate channel will vary to some extent depending on the mold configuration, operating conditions and the particular material being molded. When using the thermoplastic materials as defined hereinafter, the orifice section may have a diameter of up to about 0.150 inches and preferably up to about 0.10 inches. The length of the orifice section will also vary and generally an L/D (length-/diameter) ratio of from about 5:1 to about 30:1 and preferably from about 7:1 to about 10:1 will be used. The overall length of the orifice gate channel will be greater when using a coned out inlet section and while this overall length will vary, it is generally desirable not to have an overly long gate.

Figure 3:
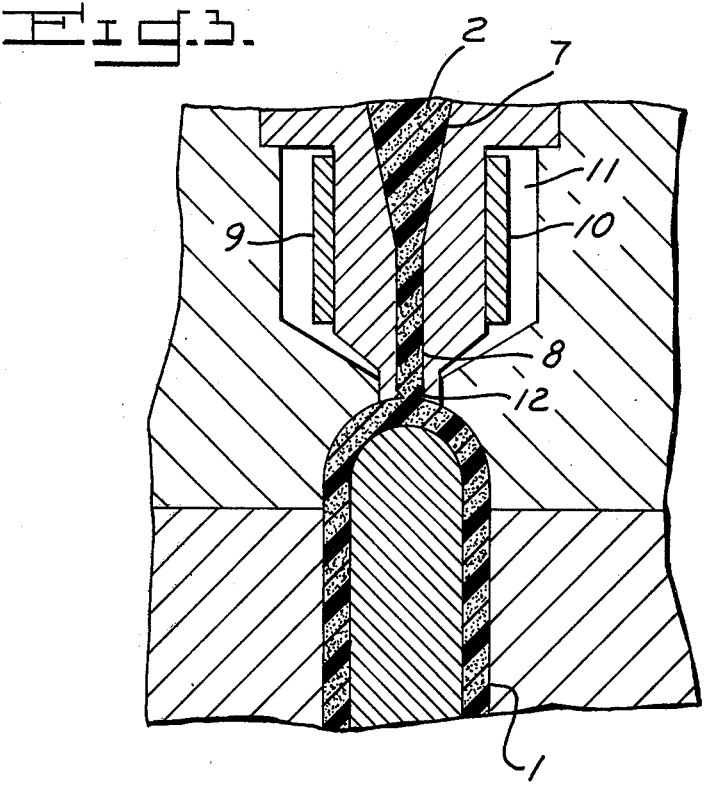
FIG. 3 is a cross section showing a modified portion of the gate channel of FIGS. 1 and 2.

A further modification to the orifice gate channel is shown in FIG. 3. This involves the addition of an orifice gate channel or nozzle reducer 12 provided at the tip end or lip of the gate channel or juncture where it meets the cavity 1. This reducer or restriction in the orifice gate channel is provided to avoid the undesirable formation of a tail on the formed preform which results when using a straight through gate channel. To perform this function, such reducer generally requires only a slight restriction or reduction in the orifice gate channel diameter e.g. the reducer may have an opening with a diameter of about 0.003 to about 0.010 inches less than said orifice gate channel diameter.

It is to be further noted that while the drawings illustrate a single cavity, a plurality of cavities may be provided from one or more inlet sprues as desired.

The orifice gate channel system as defined herein minimizes the need to specifically size each individual gate to balance the flow into the cavities.

In carrying out the method of this invention, an elongated tubular preform made of thermoplastic material and having an open end and closed end as typically illustrated by the drawings will be used. A typical preform of this nature is shown in further detail in Sincock, U.S. Pat. No. 3,900,120 issued Aug. 19, 1975 wherein representative sizes, weights and dimensions are given.

Any thermoplastic material which may be injection molded into a preform and subsequently thermoformed into a hollow article may be used in the method of this invention including those based on polymers such as styrene, nitrile polymers e.g. acrylonitrile and methacrylonitrile, ethylene, propylene and olefins such as isobutylene, acrylates, polyesters such as polyethylene terephathate and a variety of others such as disclosed in Modern Plastics Encyclopedia, October 1974, Vol. 51, No. 10A, pp. 542–564. One particularly preferred material of this type is nitrile polymer containing from about 55 to about 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, glutaronitrile, methylene glutaronitrile, fumaronitrile as well as mixtures of these monomers. The preferred monomers which are interpolymerized with the nitrile monomers include aromatic monomers such as styrene and alpha methyl styrene; lower alpha olefins containing 2 to 6 carbon atoms such as ethylene, propylene, butylene, isobutylene, etc; acrylic acid and methacrylic acid and the corresponding acrylate and methacrylate esters containing 1 to 4 carbon atoms such as methyl acrylate, ethyl acrylate, propyl acrylate and the corresponding methacrylates; vinyl esters such as vinyl acetate; vinyl ether, ethyl vinyl ether etc.; and mixtures thereof.

Optionally impact modifying materials such as a synthetic or natural rubber component e.g. polybutadiene, isoprene, neoprene, nitrile rubbers, acrylate rubbers, natural rubbers, acrylonitrile-butadiene copolymers, ethylene-propylene copolymers, chlorinated rubbers, etc. may be used to strengthen or toughen the high nitrile materials. Generally the amounts of such rubber component will vary from 0 to about 25% by weight based on the total polymer weight.

The particularly preferred nitrile polymers useful as the article material are those containing from about 55 to 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from about 60 to 83% by weight whereas with methacrylonitrile the preferred range is from about 70 to about 98% by weight of methacrylonitrile which corresponds to about 55 to about 75% by weight of nitrile monomer calculated as acrylonitrile. The preferred comonomers are styrene and alpha methyl styrene. Also preferred are interpolymers such as acrylonitrile/methacrylonitrile/styrene; acrylonitrile/styrene/methyl vinyl ether and acrylonitrile/styrene/ethyl vinyl ether.

The term "thermoforming" as used in the specification and claims is intended to include all types of molding including blow molding as well as those involving molecular orientation by axially stretching and radially expanding the preform while at the orientation temperature. The term "reheat" as used in the specification and claims is intended to include the normal heating of a preform to thermoforming or molding temperature as well as the specific heating of a preform to orientation temperature when molecularly oriented articles are being prepared. A variety of hollow shaped articles such as bottles and other types of containers may be produced by this method.

Various modifications and alterations of the invention will be readily suggested to persons skilled in the art. The following example is given to illustrate the principles and practices of this invention and should not be construed as limitations thereof.

EXAMPLE

A series of 80 gram tubular, elongated preforms made of a polymer comprising a 70/30 mixture by weight of acrylonitrile/styrene monomer were injection molded using a conventional injection molding machine with injection pressure in the range of about 17,000 psi and barrel temperature in the 400° to 550° F range to produce a stock temperature of about 480° to 500° F. The molten polymer material was fed to an insulated runner system as shown in the drawings with plate temperatures operating in the range of 225° to 260° F. The runner system fed six cavities through coned out orifice gate channels as illustrated in the drawings. Band heaters were provided in the blocks surrounding each gate channel with voltages controlled using a VOM meter (volts-ohms-milliampmeter) so as to maintain the temperature of the plastic material in the channel at slightly greater than Tg or 240° – 300° F. The overall length of the gate channel was about 2.75 inches with the orifice section having a length of 0.75 inches and a diameter of 0.1 inches.

The preforms prepared as noted above were then heated to temperature of about 270° to 300° F and measurements were made along the major axis after cooling to room temperature to see if there was any significant lean or distortion. The distortion exhibited was well within tolerable limits indicating the suitability of said preforms for further preparation of hollow articles.

For comparison purposes, a series of identical preforms were prepared using an insulated runner system and gate channels having straight through walls and cartridge heater mandrels extending transversely through the runner channel. Each heater had a hot tip to assist in the severence of the sprue at the gate. After the preforms were prepared, they were heated to a temperature of about 270° to 300° F and measurements for lean or distortion made along the major axis after cooling to room temperature. The results indicated the preforms leaned badly and were significantly axially distorted. This distortion made the further preparation of articles such as the blowing of bottles with any satisfactory degree of uniform wall distribution virtually impossible or extremely difficult.

What is claimed is:

1. In the method for the production of hollow articles by thermoforming tubular, elongated reheated injection molded preforms made of thermoplastic material the improvement comprising injection molding said preforms using a mold distribution system having an insulated runner with walls approaching the glass transition temperature of the thermoplastic material, said runner connecting an inlet sprue with one or more externally heated orifice gate channels, the thermoplastic material in such channels being above its glass transition temperature.

2. The method of claim 1 wherein said thermoplastic material is a nitrile polymer containing from about 55 to 85% by weight of nitrile monomer units based on the total polymer weight.

3. The method of claim 1 wherein said orifice gate channel comprises an elongated, tubular orifice section in the form of a cylindrical bore without any torpedo-like member therein in the thermoplastic material flow direction.

4. The method of claim 3 wherein said orifice section has an L/D ratio of from about 5:1 to about 30:1.

5. The method of claim 2 wherein the material polymer is acrylonitrile.

6. The method of claim 2 wherein said orifice gate channel has a reducer to restrict the orifice diameter at the juncture of the orifice gate channel and the cavity fed by said channel.

7. The method of claim 2 wherein said orifice section has an L/D ratio of from about 7:1 to about 10:1.

8. The method of claim 5 wherein said acrylonitrile polymer contains a styrene comonomer.

9. The method of claim 8 wherein the hollow article is a bottle.

10. The method of claim 5 wherein said orifice gate channel comprises a coned out inlet section and an elongated, tubular orifice section.

* * * * *